United States Patent [19]

Yoshida et al.

[11] Patent Number: 4,917,923

[45] Date of Patent: Apr. 17, 1990

[54] CARBONACEOUS CYLINDRICAL BODY AND PROCESS FOR PRODUCING THE SAME

[75] Inventors: Akio Yoshida; Tsuneo Niinuma; Ikuo Seo, all of Iwaki, Japan

[73] Assignee: Kureha Kagaku Kogyo Kabushiki Kaishi, Tokyo, Japan

[21] Appl. No.: 209,720

[22] Filed: Jun. 22, 1988

[30] Foreign Application Priority Data

Jun. 22, 1987 [JP] Japan ................................. 62-154800
Jun. 8, 1988 [JP] Japan ................................. 63-140767

[51] Int. Cl.$^4$ ...................... B29C 41/32; B29C 53/56; B32B 27/12; C01B 31/02
[52] U.S. Cl. ................................... 428/34.1; 156/192; 156/202; 162/146; 162/157.2; 162/206; 162/207; 162/223; 162/224; 264/29.4; 264/29.6; 264/131; 264/137; 264/294; 264/344; 427/227; 427/228; 428/219; 428/408
[58] Field of Search ...................... 264/29.4, 29.6, 131, 264/137, 173, 294, 324, 344; 156/184, 192, 202, 216, 222; 162/146, 157.2, 157.6, 206, 207, 223, 224; 427/227, 228, 430.1; 428/34.1, 34.2, 34.3, 213, 215, 218, 220, 408, 219; 423/447.2, 447.4, 447.7, 447.9, 449

[56] References Cited

U.S. PATENT DOCUMENTS

| | | | |
|---|---|---|---|
| 3,814,642 | 6/1974 | Araki et al. | 428/408 X |
| 3,922,412 | 11/1975 | Yoshikawa et al. | 264/29.6 X |
| 4,064,207 | 12/1977 | Decrescente et al. | 264/29.6 |
| 4,226,816 | 10/1980 | Yamamoto et al. | 264/29.4 |
| 4,359,438 | 11/1982 | Hoggins et al. | 264/105 |
| 4,576,770 | 3/1986 | Schultz | 264/29.5 X |
| 4,619,796 | 10/1986 | Awata et al. | 264/29.4 |
| 4,627,944 | 12/1986 | Murakami et al. | 264/29.4 |
| 4,728,535 | 3/1988 | Joo et al. | 264/29.4 |

FOREIGN PATENT DOCUMENTS

| | | | |
|---|---|---|---|
| 118232 | 9/1984 | European Pat. Off. | |
| 127887 | 12/1984 | European Pat. Off. | 264/29.4 |

*Primary Examiner*—Jeffery Thurlow
*Assistant Examiner*—Leo B. Tentoni
*Attorney, Agent, or Firm*—Nixon & Vanderhye

[57] ABSTRACT

A carbonaceous cylindrical body including a composite body of a carbonized material of a thin paper-like supporting body having a strength ratio of lengthwise direction to widthwise direction of 2 to 10 and obtained by manufacturing a paper-like body so that its carbonizable fibers are oriented and a carbonaceous matrix having an optically isotropic structure under a polarizing microscope and which shows a carbon content of at least 85% by weight, an oxygen gas permeation coefficient of $10^{-2}$ to $10^{-7}$ cm$^2$/sec. under a partial pressure of oxygen of 1 atmosphere and a bulk density of from 1.4 to 1.9 g/cm$^3$. A process for producing the carbonaceous cylindrical body is also provided.

18 Claims, No Drawings

CARBONACEOUS CYLINDRICAL BODY AND PROCESS FOR PRODUCING THE SAME

BACKGROUND OF THE INVENTION

The present invention relates to a carbonaceous cylindrical body of a small caliber, of which the bulk density, the gas permeability, the thermal conductivity and the thickness can be adjusted in the respective favorable ranges, and to a process for producing the carbonaceous cylindrical body.

More in detail, the present invention relates to a carbonaceous cylindrical body comprising a composite body consisting of a carbonized material of a thin paper-like supporting body which has been prepared by manufacturing a paper-like body so that its carbonizable fibers are oriented and shows the strength ratio of the lengthwise direction to the widthwise direction of from 2 to 10 and a carbonaceous matrix showing an optically isotropic structure or an optically anisotropic structure having mosaic structure consisting of particles of not more than 10 $\mu$m in size under a polarizing microscope, the carbonaceous cylindrical body showing a carbon content of not less than 85% by weight, an oxygen gas permeation coefficient of from $10^{-2}$ to $10^{-7}$ cm$^2$/sec. Under a partial pressure of oxygen of 1 atm and a bulk density of from 1.4 to 1.9 g/cm$^3$, and also relates to a process for producing the carbonaceous cylindrical body showing an carbon content of not less than 85% by weight, an oxygen gas permeation coefficient of from $10^{-2}$ to $10^{-7}$ cm$^2$/sec. Under a partial pressure of oxygen of 1 atm and the bulk density of from 1.4 to 1.9 g/cm$^3$, the process comprising the steps of (1) providing a carbonizable precursor of carbon onto a thin paper-like supporting body which has been obtained by manufacturing a paper-like body so that its carbonizable fibers are oriented and shows the strength ratio of the lengthwise direction to the widthwise direction of from 2 to 10, thereby obtaining a carrying body, (2) hardening said carrying body by heating thereof singly under pressure, thereby obtaining a sheet-like molded material or (2') after laminating a number of said carrying bodies so that the respective directions of orientation of said fibers are the same, hardening and thus laminated carrying bodies by heating under a pressure, thereby obtaining a sheet-like molded material, (3) winding cylindrically said sheet-like molded material in the lengthwise direction in a single layer or in multiple layers, thereby forming a cylinder-form material and (4) carbonizing said cylinder-form material at a temperature of not lower than 800° C. in an inert atmosphere.

Since the carbonaceous cylindrical body having a single layer structure or multiple layers structure of the present invention has heat-resistance and corrosion-resistance which are characteristic to carbon materials, and the gas permeation coefficient can be adjusted over a wide range, it is useful in the various uses requiring electroconductivity, thermal conductivity and the gas-impermeability at the same time of requiring the heat-resistance and corrosion-resistance.

As a carbonaceous thin plate and a process for producing the same, the following have been proposed.

Japanese patent application Laid-Open (KOKAI) No. 59-26907 (1984) discloses a thin plate of graphite produced by a process comprising the steps of preparing a paste by adding a liquid thermosetting resin to a micro-powdery graphite which is not more than 100 $\mu$m in size and has been thermally treated preliminarily to a temperature of not lower than 2700° C. and kneading the thus formed material, molding the thus obtained paste into a thin-plate form by a rolling molder, hardening the thus obtained thin plate by heating thereof or hardening the thin plate while placing the heating plates on the both side of the thin plate under a pressure and then carbonizing the thus hardened thin plate by heating thereof, and the process for producing the thin plate of graphite.

Japanese patent application Laid-Open (KOKAI) No. 59-21514 (1984) discloses a process for producing a glass-like thin plate of carbon, which process comprises the steps of mixing a chlorinated resin of vinyl chloride and/or a vinyl chloride resin with a furan resin, kneading the thus obtained mixture, molding the thus kneaded mixture into a film or a sheet, subjecting the thus obtained, molded material to a treatment to form a carbon precursor and calcining the carbon precursor in an inert atmosphere.

Although the carbonaceous thin plates and the processes for producing thereof have been proposed in large numbers as shown above, the carbonaceous cylindrical body obtained by carbonizing and calcining the cylindrical body prepared by winding cylindrically the molded body of the carbonaceous thin plate into a small caliber while utilizing the flexibility thereof cannot be put to practical uses because of the large occurrence of crevices and cracks. Moreover, it is also difficult to obtain a thin carbonaceous cylindrical body excellent in dimensional accuracy.

On the other hand, a process for producing a cylinder with a thin wall, which comprises the steps of (1) mixing a pitch obtained by thermally treating a petroleum tar or a coal tar as a binder, with coke, (2) kneading the thus obtained mixture into a paste, (3) extruding the thus obtained paste into a cylindrical form by an extruder, (4) repeating the calcination thereof and the impregnation of the above-mentioned pitch thereinto, thereby compacting the material of the cylinder and (5) subjecting the thus obtained cylinder to machining, has been generally carried out. However, the above-mentioned process requires complicated steps such as machining and accordingly, the process is disadvantageous economically.

Moreover, a carbonaceous thin plate comprising a composite body consisting of a thin paper-like supporting body which has been used as the base material and has been substantially carbonized and a carbonaceous matrix showing an optically isotropic structure or an optically anisotropic structure having mosaic structure consisting of particles of not more than 10 $\mu$m in size under a polarizing microscope and showing a carbon content of not less than 95% by weight, a gas-permeation coefficient of from $10^{-5}$ to $10^{-7}$ cm$^2$/sec, a specific resistance of from $2 \times 10^{-3}$ to $6 \times 10^{-3}$ $\Omega$.cm in the direction of thickness, a bulk density of from 1.4 to 1.9 g/cm$^3$ and the process for producing thereof have been also disclosed (refer to Japanese patent application Laid-Open (KOKAI) No. 60-239358 (1985)).

Although the above-mentioned patent application offers a thin plate in which crevices and cracks do not occur, particularly in the case of producing a cylindrical body of a small caliber while utilizing the flexibility of the thin carrying body prepared by the steps of impregnating the carbonizable precursor material into a thin paper-like supporting body which has been substantially carbonized and hardening the thus treated supporting body by heating under pressure, it has been impossible to avoid the occurrence of crevices and cracks when the cylindrical body is formed.

As a result of the present inventors' earnest researches for solving the above-mentioned problem and finding a process for producing a carbonaceous cylindrical body excellent in dimensional accuracy and with a thin wall, in which crevices and cracks scarcely occur even in the case of the small caliber thereof, without taking complicated steps and in a low producing cost, it has been found out by the present inventors that in the case where a carbonizable precursor of carbon is provided onto a thin paper-like supporting body, which has been obtained by manufacturing a paper-like body so that its carbonizable fibers are oriented and shows the strength ratio of the lengthwise direction to the widthwise direction of from 2 to 10, to obtain a carrying body, and thus obtained carrying body is hardened singly by heating thereof under pressure or a multiple number of the carrying bodies are laminated in the same direction and are hardened by heating thereof under pressure, the thus obtained sheet-like molded material is wound cylindrically in the lengthwise direction in a single layer or in a multiple layers to form a cylindrical body and the thus formed cylindrical body is carbonized and calcined, the cylindrical body wound in the lengthwise direction is tough due to the reinforcing effect formed by the lengthwise orientation of the fibers in the paper-like supporting body, crevices and cracks scarcely occur in the steps of carbonization and calcination even in the case of a small caliber and a carbonaceous cylindrical body excellent in the dimensional accuracy can be produced in a simple process, and on the basis of the above-mentioned finding, the present inventors have attained the present invention.

SUMMARY OF THE INVENTION

The object of the present invention is to provide a carbonaceous cylindrical body comprising a composite body consisting of a carbonized material of a thin paper-like supporting body which has been prepared by manufacturing a paper-like body so that its carbonizable fibers are oriented and shows the strength ratio of the lengthwise direction to the widthwise direction of from 2 to 10 and a carbonaceous matrix showing an optically isotropic structure or an optically anisotropic structure having mosaic structure consisting of particles of not more than 10 $\mu$m in size under a polarizing microscope, the carbonaceous cylindrical body showing a carbon content of not less than 85% by weight, an oxygen gas permeation coefficient of from $10^{-2}$ to $10^{-7}$ cm$^2$/sec. under a partial pressure of oxygen of 1 atm and a bulk density of from 1.4 to 1.9 g/cm$^3$.

Also, the object of the present invention is to provide a carbonaceous cylindrical body of small caliber and having a thin wall, of which crevices and cracks have scarcely occurred even in the case of a small caliber and of which the bulk density, the gas permeation coefficient, the thermal conductivity and the thickness are adjusted respectively in a favorable region.

The object of the present invention is to provide a process for producing a carbonaceous cylindrical body of a carbon content of not less than 85% by weight, an oxygen gas permeation coefficient of from $10^{-2}$ to $10^{-7}$ cm$^2$/sec. Under a partial pressure of oxygen gas of 1 atm and a bulk density of from 1.4 to 1.9 g/cm$^3$, which process comprises the steps of (1) providing a carbonizable precursor of carbon onto a thin paper-like supporting body which has been obtained by manufacturing a paper-like body so that its carbonizable fibers are oriented and shows a strength ratio of its lengthwise direction to the widthwise direction of from 2 to 10, thereby obtaining a carrying body, (2) hardening said carrying body by heating thereof singly under pressure, thereby obtaining a sheet-like molded material or (2') after laminating a number of said carrying body so that the respective directions of orientation of said fibers are the same, hardening the thus laminated carrying bodies by heating under pressure, thereby obtaining a sheet-like molded material, (3) winding cylindrically said sheet-like molded material in the lengthwise direction in a single layer or in multiple layers, thereby forming a cylinder-form material and (4) carbonizing said cylinder-form material at a temperature of not lower than 800° C. in an inert atmosphere.

The object of the present invention is to provide a process for producing industrially and economically a carbonaceous cylindrical body having a thin wall, on which crevices and cracks have scarcely occurred even in the case of a small caliber, by a series of the three single steps without necessitating the complicated steps of the conventional technique which repeats the step of impregnating a resin which forms the carbonaceous matrix (the resin is referred hereinafter as the matrix resin) by carbonization and the step of calcination.

DETAILED DESCRIPTION OF THE INVENTION

The carbonaceous cylindrical body having a thin wall according to the present invention is obtained by a process comprising the steps of (1) providing a carbonizable precursor of carbon onto a thin paper-like supporting body, which has been obtained by manufacturing a paper-like body so that its carbonizable fibers are oriented and shows the strength ratio of the lengthwise direction to the widthwise direction of from 2 to 10, thereby obtaining a carrying body (hereinafter referred to as a green sheet), (2) hardening the thus obtained green sheet singly or after laminating a number of the green sheets by heating under pressure, thereby obtaining a sheet-like molded material (for example, a thin plate), (3) winding cylindrically the thus obtained sheet-like material in a single layer or in multiple layers, thereby forming a cylindrical material and (4) carbonizing and calcining the thus formed cylindrical material.

As the carbonizable paper-like supporting body used in the present invention, a thin paper-like supporting body having from 25 g/m$^2$ to 50 g/m$^2$ areal weight constituting fibers which can hold the carbonizable precursor of carbon uniformly and having net-form planes is used. The above-mentioned paper-like substance is constituted of fibers of high softening point, which can hold the above-mentioned carrying substance at least to the temperature of about 500° C. at which the precursor of carbon provided thereon is thermally hardened. As the above-mentioned carbonizable paper-like supporting body, the paper-like body obtained by manufacturing natural fibers and synthetic fibers into a paper-like body may be used, however, the fibers of a high softening point (for instance, not lower than 470° C.) which can hold the above-mentioned precursor of carbon at least to the temperature at which the thus carried precursor is thermally hardened are preferable. In the above-mentioned meaning, carbon fiber paper obtained by manufacturing carbon fibers into paper is particularly favorable.

As the raw material for the above-mentioned carbon fibers, the fibers obtained, for instance, from pitch obtained by thermally treating a petroleum tar or a coal tar, polyacrylonitrile, cellulose and phenol resin are used. Such a fiber as the raw material is used after thermally treating thereof at a temperature of not higher than 1000° C. in an inert atmosphere following a conventional method so that a margin is retained therein for adjusting to the contraction of the matrix resin of the carbonaceous cylindrical body at the time of calcining thereof at a high temperature and cutting the thus treated material into the short fibers of from 1 to 100 mm in length and of from 10 to 30 μm in diameter. Moreover, more than one kind of fibers selected from the group consisting of pulp, polyvinyl alcohol and polyethylene may be mixed with the above-mentioned carbon fiber in an optional proportion.

The specific feature of the present invention lies in the use of the paper-like supporting body which has been formed by manufacturing the above-mentioned fibers into a paper-like supporting body and shows a strength ratio of the lengthwise direction and the widthwise direction which is in the right angle thereto of from 2 to 10, preferably from 5 to 7.

The step of manufacturing the paper-like supporting body is carried out by dispersing the short fibers of from 1 to 100 mm, preferably of from 10 to 30 mm in length in water, etc. at a suitable concentration and adjusting the speed of manufacturing of, for instance, a cylinder paper machine, etc. so that the strength ratio of the lengthwise direction of the widthwise direction which is in a right angle thereto is from 2 to 10. With the increase of the speed of manufacturing paper, the short fibers are apt to be more easily oriented into the lengthwise direction and the strength of the paper-like supporting body in the lengthwise direction becomes larger.

In the case where the strength ratio is not larger than 2, although the occurrence of crevices and cracks is not observed at the time of carbonizing and calcining the cylindrical body by forming the cylindrical body from the sheet-like molded material, the speed of manufacturing the paper-like supporting body should be extremely small, and the speed becomes almost the hand-processing speed. Accordingly, the productivity of the cylindrical body is poor and the process becomes disadvantageous economically.

On the other hand, in the case where the strength ratio is in excess of 10, the fibers are oriented too much and the paper-like supporting body tears easily in the lengthwise direction resulting in difficulty in handling the material.

The strength ratio of the paper-like supporting body is measured by following Japanese Industrial Standards (JIS) P 8113-1976. Namely, the paper-like supporting body is adjusted to 200 mm in the lengthwise direction and to 15 mm in the widthwise direction which is in a right angle thereto, each of the two ends of the body is fixed by a zipper of 20 mm, the thus treated body is pulled at a speed of 10 mm/min by a tension tester and the strength at the break of the body (Pmax) is obtained. The strength ratio is obtained by dividing the Pmax in the lengthwise direction by the Pmax in the widthwise direction.

As the matrix resin (that comprises carbonizable precursor of carbon, for it forms the carbonaceous matrix by carbonization) used in the present invention, a pitch-like substance having a yield of carbonization at the time of calcining at 900° C. in an inert atmosphere of not lower than 60% by weight and of softening point not higher than 450° C. is preferable.

Such a pitch-like substance forms the minute mosaic-like carbon or the isotropic carbon by carbonization thereof.

The present inventors investigated the pitch-like substance in which the cracks and crevices do not occur at the time of carbonizing the substance. As the result, we found that the following three types of texture are observed when the pitch-like substance is carbonized by calcination, the cross-section of the thus obtained carbon material is polished and the thus polished cross-section is observed by a polarizing microscope:

(1) A flow-form texture, which is the well-developed multi-layer structure of the net-like plane of the six-membered rings which can be said to be the enormous plane molecules constituting the carbon substance, is observed.

(2) A minute mosaic-like texture, in which the degree of the development of the layer structure of the above-mentioned net-form plane is smaller as compared to that in (b 1), is observed.

(3) An optically isotropic texture, in which any texture showing a polarized light is not observed because of the non-development of the layer-structure, is observed.

Among the above-mentioned three types of texture, the flow-form texture which shows the large difference of contraction between the direction of the net-form plane of a net-form planar structure of lamellar six-membered rings and the direction which is perpendicular to the former at the time of carbonization and calcination of the pitch-like substance, is known to be severely cracked.

In the case of the mosaic-form carbon or the isotropic carbon, the development of the lamellar net-form plane structure in the direction of the net-form plane and in the direction perpendicular to the former is small or does not occur yet and the lamellar structure is distributed in random directions. Namely, such a structure is isotropic macroscopically, and the stress-concentration occurs difficulty in such a structure resulting in the difficulty of occurrence of cracks.

As a result of the present inventors' various examinations, it has been known by the present inventors that the occurrence of crevices and cracks of the cylindrical body can be prevented in the case where the size of the mosaic texture is not larger than 10 μm (refer to Japanese patent application Laid-Open (KOKAI) No. 60-239358/1985).

Particularly, the pitch-like substance, which can be converted into the mosaic-form carbon of not larger than 5 μm in size or the isotropic carbon by carbonization and shows the yield of carbonization of 70 to 95% by weight at the time of calcination at 900° C. in an inert atmosphere and the softening point of from 250 to 400° C., is desirable.

The softening point of the pitch-like substance herein shown is measured as follows:

While using a KOKA-type flow tester (made by SHIMAZU Works Co., Ltd.) 1 g of the sample pulverized into particles of not larger than 250 μm in size is filled in a cylinder of 1 cm$^2$ in the cross section, which has a nozzle of 1 mm in diameter at the bottom of the cylinder, and the thus filled sample is heated at the speed of 6° C./min while applying a pressure of 10 kg/cm$^2$G on the sample. Although the powdery particles of the sample are softened, the rate of packing is improved and the volume of the powdery sample decreases with the elevation of the temperature of the sample, the decrease of the volume of the sample stops at a certain temperature. In the case of continuing the elevation of the temperature, the sample melts and flows from the nozzle at the bottom of the cylinder. The temperature at which the decrease of the volume of the powdery sample stops is defined as the softening point of the sample.

The pitch-like substance, which shows a softening point of not higher than 450° C. and a yield of carbonization at 900° C. in an inert atmosphere of not less than 60% by weight and which is convertible to the minute mosaic-form carbon or the isotropic carbon by carbonization and is used in the present invention, is easily obtained by the process wherein oxygen, sulfur, nitric acid, etc. are added to a tar such as coal tar, petroleum tar, etc. and the thus formed mixture is thermally treated at a temperature of from 150° to 450° C. to obtain a pitch into which oxygen, sulfur or nitrogen has been introduced, or is easily obtained by the process of subjecting the pitch to oxidation treatment, for instance, by the process described in Japanese Patent Publication No. 53-31116.

As the carbonizable precursor of carbon, the mixture obtained by adding a carbonaceous fine powder material of not larger than 10 μm in diameter, for instance, graphite, carbon black etc. to the pitch-like substance in an amount of not more than 70% by weight, preferably 10–30% by weight is preferable, because it can be kneaded uniformly.

After adding the carbonaceous fine powdery material, for example, graphite, carbon black etc. which has a particle size of not larger than 10 μm in an amount of not more than 70% weight to the pitch-like substance, a thermosetting resin such as phenol resin or furan resin may be added. In the case where the solution for carrying or a slurry is prepared by using a solvent which dissolves the thermosetting resin, the solution or the slurry is stabilized due to the viscosity-raising action of the thermosetting resin, and the adherence of the mutual matrices in the thus obtained green sheet becomes stronger or the adherence with the supporting body becomes stronger. The amount of addition of the thermosetting resin is below 40% by weight, preferably from 5 to 20% by weight of the total matrix resin (the precursor of carbon).

As the method for providing the precursor of carbon onto the carbonizable paper-like supporting body to prepare the green sheet, a method, which comprises the steps of (1) making the precursor of carbon into a solution or into a slurry, (2) immersing the paper-like supporting body into the solution or coating the solution onto the paper-like supporting body in the case of the solution or (2') coating the slurry onto the paper-like supporting body in the case of the slurry and then (3) evaporating the solvent in the solution or in the slurry, thereby drying the thus treated paper-like supporting body, is favorable.

As the solvent, methanol, ethanol, acetone, benzene, toluene and a mixture thereof are used. As the solvent of the slurry, water, methanol, ethanol, acetone and a mixture thereof are used. In the case of making the slurry, it is desirable to make the precursor of carbon (the matrix resin) into a fine powdery material. The concentration of the precursor of carbon in the solution or the slurry is preferably from 10 to 50% by weight.

In the above-mentioned methods, in order to improve the adherence of the mutual matrix resins and the adherence with the paper-like supporting body or in order to improve the stability of the slurry, a small amount of the third substance, for instance, a viscosity-raising agent, a surfactant, etc. may be added to the solution or the slurry.

The amount of carrying the precursor of carbon onto the carbonizable paper-like supporting body, which does not cause the crevices and the cracks on the carbonizable paper-like supporting body is from 70 to 90% by weight to the green sheet.

In the case where the amount of carrying the precursor of carbon is below 70% by weight, the gas-permeability of the thus obtained carbonaceous cylindrical body becomes larger and on the other hand, in the case where the amount of carrying the precursor is over 90% by weight, it becomes difficult to uniformly carry the precursor of carbon onto the supporting body.

According to the above-mentioned method, the solvent in the paper-like supporting body which has carried the solution of the matrix resin or the slurry of the matrix resin is evaporated and the wet paper-like supporting body is dried to obtain the green sheet (the dried paper-like substance carrying the matrix resin), and the thus obtained green sheet is subjected to heat treatment under evaporating and drying conditions in the range of from 60° to 150° C. until the remaining amount of the solvent becomes not more than 1% by weight.

One of the thus prepared green sheets is supplied to a prescribed metal mold or a number of the green sheets are laminated so that the direction of orientation of the fibers of the respective green sheets becomes the same and the thus laminated green sheets are supplied to the prescribed metal mold, and the single green sheet or the laminated green sheet is (are) subjected to the press-molding at a temperature of from 150° to 600° C., preferably from 150° to 470° C. under a pressure of molding surfaces of not more than 100 kg/cm², preferably 10 to 30 kg/cm² for not shorter than 10 min., preferably for 60 to 180 min.

Particularly, in order to produce a carbonaceous cylindrical body of a small caliber not larger than 200 mm, a molding temperature of from 150° to 470° C. is desirable, and in the case where the molding temperature becomes higher, the thermal hardening proceeds too much, and in the case of trying to produce the carbonaceous cylindrical body of a small caliber, crevices are apt to occur.

The above-mentioned single layer or the above-mentioned multiply laminated layers of the sheet-like molded material is (are) wound in a single layer or in multiple layers to the lengthwise direction of the paper-like supporting body before molding to form a cylinder-form material. According to the present invention, by using a sheet-like molded material which shows a strength ratio of the lengthwise direction to the direction perpendicular thereto of from 2 to 10 and has the fibers oriented to the lengthwise direction in the paper-like supporting body of the sheet-like molded material, it is possible to easily wind cylindrically the sheet-like molded material onto the metal mold (which may be a material such as a pipe) of a smaller outer diameter than in previous times without the occurrence of crevices and cracks. By winding cylindrically the sheet-like molded material in a single layer or in multiple layers as above and adhering the end-part thereof with a carbonizable bonding material to the cylindrical body, the cylinder-form material is formed. Or the cylindrical material is formed without carrying out the adhesion. In the case of not carrying out the adhesion, the sheet(s) is (are) wound on a mold made from graphite and, for instance, the wound sheet is tightly bound up by graphite fibers to fix the wound sheet. The carbonization and calcination of the thus wound sheet are carried out in the above-mentioned, fixed state of the wound sheet.

Since the cylinder-form material with the end parts not fixed is flexible in the diametrical direction, in the case where it is inserted as a sleeve, it can be readily fitted even in the case where the diameters thereof are different mutually in a certain extent.

As the carbonizable adhesives, an adhesive using a phenol resin as the base, for instance, a single substance of a novolac resin or a mixture of the novolac resin with a minutely pulverized carbonaceous material such as graphite, coke, etc. may be exemplified.

In the case where the sheet-like molded material is obtained by singly using the green sheet, the diameter of the prescribed metal mold can be made smaller than in the case where sheet-like molded material consists of multiple number of the green sheets. For instance, as will be shown in the Examples, in the case where the sheet-like molded material is composed of a single green sheet, the calcined and carbonized carbonaceous cylindrical body can be obtained without the occurrence of crevices and cracks even in the case where the outer diameter of the metal mold is made smaller than 25 mm.

On the other hand, in the case where the sheet-like molded material is obtained by laminating four sheets of the green sheets and is hardened at 460° C., it has been confirmed that crevices and cracks occur in the formation of cylindrical body in the case of using a metal mold of outer diameter of not larger than 40 mm.

The carbonization and calcination of the cylindrical material are carried out in an inert atmosphere at a temperature of from 800° to 3000 °C. while removing the cylinder-formed material having the end part adhered from the metal mold. In the case of the cylinder-formed material having the end part not adhered, the carbonization and calcination are carried out at the state of tighly binded to the above-mentioned graphite mold.

The thus obtained carbonaceous cylindrical body shows the carbon content of not less than 85% by weight, preferably 95% by weight, the gas-permeation coefficient of from $10^{-2}$ to $10^{-7}$ cm$^2$/sec. preferably from $10^{-5}$ to $10^{-7}$ cm$^2$/sec. and the bulk density of from 1.4 to 1.9 g/cm$^3$.

The thickness of the wall of the carbonaceous cylindrical body can be adjusted optionally according to the thickness of the sheet-like molded material and the number of windings of the sheet-like molded material.

For example, in the case where the sheet-like molded material is formed from a single green sheet, if the wall thickness of the carbonaceous cylindrical body is about 0.2 mm, the wall thickness thereof formed from the sheet-like molded material consisting of four sheets of green sheet would be about 0.8 mm.

Of course, the wall thickness of the carbonaceous cylindrical body can be varied according to the kind of green sheet but generally, the wall thickness of a carbonaceous cylindrical body is preferably 0.1-0.8 mm.

Although it is possible to produce the carbonaceous cylindrical body having the optional caliber, in the case where the wall thickness thereof is about 0.1 mm, the cylindrical body having an inner diameter of the lower limit of 20 mm can be obtained. The lower limit becomes larger depending upon increment of the wall thickness and in the case where the wall thickness is about 0.8 mm, the lower limit becomes 40 mm.

The particularly favorable mode for producing the carbonaceous cylindrical body of the small caliber according to the present invention is as follows:

The carbonizable precursor of carbon is provided onto the carbon fiber paper obtained by manufacturing paper so that carbon fibers of from 1 to 100 mm in length are oriented. The thus obtained carrying body is hardened by heating to a temperature of from 150° to 470° C. under a pressure to obtain a sheet-like molded material. The thus hardened sheet-like molded material is used in the production of the carbonaceous cylindrical body.

According to the above-mentioned process, the carbonaceous cylindrical body of wall thickness of not less than 0.1 mm and an inner diameter having the lower limit of from 20 to 40 mm can be easily produced.

The carbonaceous cylindrical body according to the present invention comprises the thin paper-like supporting body which has been obtained by manufacturing a paper-like body so that its carbonizable fibers are oriented and shows a strength ratio of the lengthwise direction to the width-wise direction of from 2 to 10 and the specified carbonaceous matrix. Accordingly, even in the case of producing the cylindrical body having a thin wall and small caliber, crevices and cracks scarcely occur in the step of calcination, and it is possible to produce cylindrical bodies having a caliber in a wide range of size.

Moreover, since the carbonaceous cylindrical body which is dense and shows a small gas-permeability can be also obtained, it is useful as the material for preventing the oxidation of the surface of the heat-insulating material for a furnace of high temperatures and a combustion nozzle of high temperatures.

The process according to the present invention comprises the steps of (1) providing a carbonizable precursor of carbon onto a thin paper-like supporting body which has been obtained by manufacturing a paper-like body so that its carbonizable fibers are oriented and shows a strength ratio of the lengthwise direction to the widthwise direction at a right angle to the former of from 2 to 10, thereby forming a thin sheet-like material, (2) winding cylindrically the thus obtained sheet-like material in a single layer or in multiple layers, thereby forming a cylindrical body and (3) carbonizing and calcining the thus formed cylindrical body.

Accordingly, according to the process of the present invention, it is possible to offer the carbonaceous cylindrical body of a small caliber, which does not suffer from the occurrence of crevices and cracks and of which the bulk density, the gas permeability, the thermal conductivity and the wall thickness have been adjusted respectively in a favorable range, extremely easily by a single molding and calcination without passing the complicated steps of repeating the impregnation of the matrix resin and the calcination.

Further, the gas permeation coefficient, which is used in the present invention and the following Examples, has been measured following "The method for measuring the mobility of oxygen gas through the plastic films and sheets, ASTM D-3985-81". According to the above-mentioned method, nitrogen gas is supplied to one of the sides of the thin plate to prevent the diffusion of oxygen from the atmosphere, oxygen gas of 100% in purity is introduced to the other side of the thin plate and the amount of oxygen gas which diffuses and permeates to the side of nitrogen gas through the thickness of the specimen (the thin plate) is measured by the quantitative measuring method of electrical quantity while using an oxygen sensor. Accordingly, the value of the gas-permeability [$cm^2$(S.T.P)/cm.sec.] of the present invention is the measured value in the case where the total pressure is due to oxygen at 1 atm (the partial pressure of oxygen: $\Delta P = 1$ atm) and is measured at 20° C., the measured value being presented by the value converted to the volume of the gas at the standard state.

Further, the gas-permeation coefficient ($cm^2$/sec: $O_2$, $\Delta P = 1$ atm) is presented by the value obtained by multiplying the thus measured gas-permeability [$cm^2$(S.T.P)/cm.sec.] by the thickness of the specimen while assuming that the carbonaceous thin plate specimen of the present invention is homogenous.

The present invention will be explained more concretely while referring to the following Examples, however, the present invention is not limited to the following Examples unless the present invention goes over the essential points thereof.

EXAMPLE 1

An ethylene bottom oil was heavified for one hour at a temperature of 400° C. and the low-boiling components of the thus heavified oil were removed under a vacuum of 10 Torr at 330° C. for one hour to produce a pitch for carbon fibers.

After melt-spinning the thus produced pitch and subjecting the thus spun pitch to the treatment of infusibilization for 30 minutes at 230° C. under an oxidative atmosphere, thus infusibilized spun pitch fiber was calcined at 600° C.

90% by weight of the thus obtained carbon fibers of pitch of 30 mm in length and a diameter of 15 $\mu$m and 10% by weight of polyvinyl alcohol fibers were mixed together. Then, the thus obtained mixture was homogeneously dispersed into water containing 0.02% by weight of polyacrylamide so that the thus formed dispersion contained about 0.2% by weight of the above-mentioned mixture, and the thus formed dispersion was subjected to the manufacture of paper at a paper-manufacturing speed of 20 m/min in a cylinder paper machine to produce a carbon fiber paper of an areal weight of 30 g/$m^2$.

The strength ratio of the lengthwise direction (the direction of manufacturing the paper) to the direction in a right angle thereto was measured to be 8, and the fact showed that the fibers were oriented to the lengthwise direction.

In the next place, an ethylene bottom oil was pitchfied by subjecting the oil to thermal treatment for 3 hours at 370° C., thereby promoting the heavification thereof, and at the same time, removing the low-boiling components therefrom, to produce the pitch (A). By pulverizing the pitch (A) into powders of not larger than 100 $\mu$m in size and heating the thus pulverized pitch (A) to 190° C. at a speed of 10° C./hr. in air, the pitch (B) was produced. The softening point of the pitch (B) was 285° C., and the yield of carbonization under the calcination at 900° C. in an atmosphere of nitrogen was 72% by weight.

The pitch (B) was pulverized into fine powder so that the amount of the particles of not larger than 10 $\mu$m in size becomes not less than 90% by weight.

20 parts by weight of the thus pulverized pitch (B), 20 parts by weight of graphite powder of not larger than 80 $\mu$m in size, 0.5 part by weight of methylcellulose, 49.5 parts by weight of water and 10 parts by weight of ethanol were uniformly mixed to prepare a slurry of the above-mentioned ratio of the components.

The thus prepared slurry was uniformly applied onto the above-mentioned carbon fiber paper by a spraying method to prepare a wet paper of 519 g/$m^2$ in areal weight. The wet paper was dried by heating 60°–150° C. to produce a green sheet of 230 g/$m^2$ in areal weight.

Four sheets of the thus produced green sheet were laminated so that the orientation of the fibers became the same, and after introducing the thus laminated green sheets into a metal mold, the sheets were heated to 430° C. at a speed of 50° C./hr. and after pressing the thus heated sheets for 120 minutes under a pressure of 20 kg/$cm^2$, the sheets were heated to 460° C. at a speed of 10° C./hr. under a pressure of 1 kg/$cm^2$. Thereafter, the thus treated sheets were cooled to produce a thin plate. The thus produced thin plate was flexible and could be subjected to bending in the direction of the orientation of the fibers.

After adjusting the dimensions of the thin plate to 160 × 180 mm, the thus adjusted thin plate was wound cylindrically on a stainless-steel cylinder of 40 mm in outer diameter and 200 mm in length and the end part of the thin plate were adhered with carbon cement to obtain a cylinder of 44 mm in outer diameter.

The thus obtained cylinder was calcined at 2000° C. in an inert atmosphere to produce a carbonaceous cylindrical body of 0.65 mm in wall thickness and 40 mm in the inner diameter. In the case where a part of the above-mentioned cylindrical body was polished and the polished part was observed by a polarizing microscope, it was observed that the carbonaceous matrix was the minute mosaic-like carbon of not larger than 5 $\mu$m in size.

The specific properties of the thus obtained carbonaceous cylindrical body are shown in Table 1.

EXAMPLE 2

The dimensions of the thin plate obtained in Example 1 were adjusted to 1150 × 180 mm while making the direction of orientation of the fibers to the longitudinal direction, and the thus adjusted thin plate was wound threefoldly on a graphite pipe of 110 mm in outer diameter and 200 mm in length.

After binding the thus wound plate with graphite fibers, the thus treated material was calcined at 2000° C. in an inert atmosphere to obtain a carbonaceous cylindrical body of 2.0 mm in wall thickness and 112 mm in inner diameter.

Since the end part of the thus obtained carbonaceous cylindrical body were not adhered, the cylinder is flexible in the direction of its diameter, and can be used suitably as the inner cylinder of a nozzle part.

Further, no crevices or cracks were observed on the thus obtained carbonaceous cylindrical body.

The specific properties of the thus obtained carbonaceous cylindrical body are shown in Table 1.

EXAMPLE 3

A carbon fiber paper was manufactured in the same process as in Example 1 except for adopting the paper-manufacturing speed of 10 m/min. In the case of measuring the strength ratio of the thus obtained carbon fiber paper, it was found that the strength ratio was 2 and that the fibers therein were oriented in the lengthwise direction.

A thin plate was produced by using the thus obtained carbon fiber paper in the same process as in Example 1 except for using one sheet of the carbon fiber paper.

The thus obtained thin plate was flexible and it was possible to subject the thin plate to bending into the direction of orientation of the carbon fibers.

After adjusting the dimensions of the thin plate to 95×180 mm, the thus adjusted thin plate was wound singly on a graphite pipe of 25 mm in outer diameter and 200 mm in length and was calcined at 2000° C. in an inert atmosphere to produce a carbonaceous cylindrical body of 0.17 mm in wall thickness and 25 mm in inner diameter. Crevices and cracks were scarcely observed on the thus obtained carbonaceous cylindrical body.

The specific properties of the thus obtained carbonaceous cylindrical body are shown in Table 1.

COMPARATIVE EXAMPLE 1

After adjusting the dimensions of the thin plate obtained in Example 1 to 1150×180 mm so that the widthwise direction in which the fibers were not oriented had taken the larger dimension, the thus adjusted thin plate was tried to be wound threefoldly on a graphite pipe of 110 mm in outer diameter and 200 mm in length into the direction to which the fibers were not oriented. However, it was not possible to wind cylindrically the thin plate because of the occurrence of the crevices on the thin plate.

COMPARATIVE EXAMPLE 2

A thin plate was produced in the same process as in Example 1 except for molding at 430° C. and heating the material to 600° C. at a speed of 10° C./hr.

After adjusting the dimensions of the thus obtained thin plate to 650×250 mm so that the direction of orientation of the fibers is the longitudinal (lengthwise) direction, it was tried to wind cylindrically the thin plate on a metal mold of 200 mm in outer diameter and 300 mm in length. However, it was impossible to wind cylindrically the thin plate because of the occurrence of crevices on the thin plate.

As are seen above, in the case where the heating temperature for thermally hardening the matrix resin provided on the green sheet is as high as 600° C. different from the case of 460° C. in Example 1, it is difficult to obtain any carbonaceous cylindrical body of small caliber.

COMPARATIVE EXAMPLE 3:

A carbon fiber paper was obtained in the same process as in Example 1 except for manufacturing the carbon fiber paper by hand processing. In the case of measuring the strength ratio of the thus obtained carbon fiber paper, it was found that the strength ratio was 1 and that the fibers were scarcely oriented.

In the case of manufacturing the paper by hand processing, it is impossible to carry out the mass production of carbonaceous cylindrical body.

COMPARATIVE EXAMPLE 4

A carbon fiber paper was manufactured in the same process as in Example 1 except for manufacturing the paper at a speed of 30 m/min. In the case of measuring the strength ratio of the thus obtained carbon fiber paper, it was found that the strength ratio was 11 and that the fibers were strongly oriented to the lengthwise direction.

By the use of the thus obtained carbon fiber paper, a thin plate was produced in the same process as in Example 1.

However, the yield of forming the cylinder at the time of forming the cylindrical body was 70%, and even in the case of winding cylindrically the thin plate in the direction of orientation of the fibers, crevices occurred on the thin plate into the direction of the orientation of the fibers resulting in the difficulty of forming the cylindrical body.

The specific properties of the thus obtained cylindrical body are shown in Table 1.

TABLE 1

| | Bulk density (g/cm$^3$) | Gas-permeation coefficient (cm$^2$/sec.) | Tensile strength (kg/cm$^2$) *1 | Content of carbon (% by weight) | Presence of crevices and cracks *2 |
|---|---|---|---|---|---|
| Example 1 | 1.80 | $2 \times 10^{-6}$ | 500 | 99 | 1 |
| Example 2 | 1.80 | $2 \times 10^{-6}$ | 500 | 99 | 1 |
| Example 3 | 1.75 | $5 \times 10^{-5}$ | 430 | 99 | 1 |
| Comparative Example 1 | — | — | — | — | 4 |
| Comparative Example 2 | — | — | — | — | 4 |
| Comparative Example 4 | 1.78 | $3 \times 10^{-6}$ | 440 | 99 | 4 |

Notes:
*1 Tensile strength along direction of orientation of the fiber.
*2 Occurrence of the crevices and cracks at the time of forming the cylindrical body.
The standards of evaluation of the extent of the occurrence of the crevices and cracks are shown on the next page.

STANDARDS OF EVALUATION OF OCCURRENCE OF CREVICES AND CRACKS

1: Crevices and cracks were scarcely observed.
2: Cracks were observed in a small number.
3: Although no crevice was observed, cracks were observed all over the surface of the cylindrical body.
4: Crevices were observed and cracks were observed all over the surface of the cylindrical body.

What is claimed is:

1. A carbonaceous cylindrical body which comprises a composite body of a carbonized material of a thin paper-like supporting body having a strength ratio of lengthwise direction to widthwise direction of 2 to 10 obtained by manufacturing a paper-like body so that its carbonizable fibers are oriented and a carbonaceous matrix having an optically isotropic strucutre under a polarizing microscope and which shows a carbon content of at least 85% by weight, an oxygen gas permeation coefficient of from $10^{-2}$ to $10^{-7}$ cm$^2$/sec. under a partial pressure of oxygen of 1 atm. and a bulk density of from 1.4 to 1.9 g/cm$^3$.

2. A carbonaceous cylindrical body which comprises a composite body of a carbonized material of a thin paper-like supporting body having a strength ratio of lengthwise direction to widthwise direction of 2 to 10 obtained by manufacturing a paper-like body so that its carbonizable fibers are oriented and a carbonaceous matrix having an optically anisotropic structure having a mosaic structure consisting of particles of less than 10 μm in size under a polarizing microscope and which shows a carbon content of at least 85% by weight, an oxygen gas permeation coefficient of from $10^{-2}$ to $10^{-7}$ cm$^2$/sec. under a partial pressure of oxygen of 1 atm. and a bulk density of from 1.4 to 1.9 g/cm$^3$.

3. The carbonaceous cylindrical body according to claim 1 or 2, wherein said thin paper-like supporting body is a paper-like material obtained by manufacturing a paper-like body from short carbon fibers of from 10 to 30 μm in diameter and from 1 to 100 mm in length.

4. The carbonaceous cylindrical body according to claim 1 or 2, wherein a wall thickness thereof is from 0.1 to 0.8 mm.

5. A process for producing a carbonaceous cylindrical body of a carbon content of at least 85% by weight, an oxygen gas permeation coefficient of from $10^{-2}$ to $10^{-7}$ cm$^2$/sec. under a partial pressure of oxygen gas of 1 atm. and a bulk density of from 1.4 to 1.9 g/cm$^3$, which process comprises the steps of:
   (1) providing a carbonizable precursor of carbon onto a thin paper-like supporting body which has been obtained by manufacturing a paper-like body so that its carbonizable fibers are oriented and shows a strength ratio of its lengthwise direction to its widthwise direction of from 2 to 10, thereby obtaining a carrying body;
   (2) hardening said carrying body by heating thereof under pressure, thereby obtaining a sheet-like molded material;
   (3) winding cylindrically said sheet-like molded material in a lengthwise direction in at least a single layer thereby forming a cylinder-form material; and
   (4) carbonizing said cylinder-form material at a temperature of not lower than 800° C. in an inert atmosphere.

6. A process for producing a carbonaceous cylindrical body of a carbon content of at least 85% by weight, an oxygen gas permeation coefficient of from $10^{-2}$ to $10^{-7}$ cm$^2$/sec. under a partial pressure of oxygen gas of 1 atm. and a bulk density of from 1.4 to 1.9 g/cm$^3$, which process comprises the steps of:
   (1) providing a carbonizable precursor of carbon onto a thin paper-like supporting body which has been obtained by manufacturing a paper-like body so that its carbonizable fibers are oriented and shows a strength ratio of its lengthwise direction to its widthwise direction of from 2 to 10, thereby obtaining a carrying body;
   (2) after laminating a number of said carrying bodies so that the respective directions of orientation of said fibers are the same, hardening the thus laminated carrying bodies by heating under pressure, thereby obtaining a sheet-like molded material;
   (3) winding cylindrically sheet-like molded material in a lengthwise direction in at least a single layer thereby forming a cylinder-form material; and
   (4) carbonizing said cylinder-form material at a temperature of not lower than 800° C. in an inert atmosphere.

7. The process for producing said carbonaceous cylindrical body according to claim 5 and 6, wherein said carbonizable precursor of carbon is a pitch-like substance having a softening point of less than 450° C. and a yield of carbonization thereof by calcination at 900° C. of at least 60% by weight.

8. The process according to claim 7, wherein said carbonizable precursor of carbon is a mixture obtained by adding up to 70% by weight of a carbonaceous fine powder of up to 10 μm in diameter to said pitch-like substance.

9. The process according to claim 7, wherein said carbonizable precursor of carbon is a mixture obtained by adding up to 70% by weight of a carbonaceous fine powder of up to 10 μm in diameter and less than 40% by weight of a thermosetting resin to said pitch-like substance.

10. The process according to claim 5 or 6, wherein said thin paper-like supporting body is a paper made of carbon fibers, said paper having been manufactured from short carbon fibers of from 1 to 100 mm in length obtained by subjecting any one of fibers selected from the group consisting of a pitch of coal series, a pitch of petroleum series, polyacrylonitrile, cellulose and a phenol resin to heat treatment at a temperature of up to 1000° C. in an inert atmosphere.

11. The process according to claim 5 or 6, wherein said thin paper-like supporting body is a composite paper which has been manufactured from a mixture of at least one kind of short carbon fibers of from 1 to 100 mm in length obtained by subjecting any fiber selected from the group consisting of a pitch of coal series, a pitch of petroleum series, polyacrylonitrile, cellulose and a phenol resin to heat treatment at a temperature of up to 1000° C. in an inert atmosphere and at least one kind of fibers selected from the group consisting of pulp, polyvinylalcohol and polyethylene.

12. The process according to claim 5 or 6, wherein a method for providing said precursor of carbon onto said paper-like supporting body to obtain the carrying body comprises the steps of (1) dissolving said carbonizable precursor of carbon into any one of methanol, ethanol, acetone, benzene, toluene and mixtures thereof so that the concentration of said precursor of carbon becomes from 10 to 50% by weight, thereby obtaining a solution and (2), after coating said solution onto said paper-like supporting body, so that the content of said carbonizable precursor of carbon in said carrying body becomes from 70 to 90% by weight, evaporating said solvent from the thus treated paper-like supporting body, wherein the evaporation step is carried out at a temperature in the range of from 60° to 150° C. until the amount of said solvent in said carrying body becomes less than 1% by weight.

13. The process according to claim 5 or 6, wherein a method for providing said precursor of carbon onto said paper-like supporting body to obtain the carrying body comprises the steps of (1) suspending said precursor of carbon into any one of water, methanol, ethanol, acetone and mixtures thereof so that the concentration of said precursor of carbon becomes from 10 to 50% by weight, thereby obtaining a suspension and (2), after coating said suspension onto said paper-like supporting body, so that the content of said carbonizable precursor of carbon in said carrying body becomes from 70 to 90% by weight, evaporating said solvent from the thus treated paper-like supporting body, wherein the evaporation step is carried out at a temperature in the range of from 60° to 150° C. until the amount of said solvent in said carrying body becomes less than 1% by weight.

14. The process according to claim 5 or 6, wherein said hardening of the carrying body is carried out under a pressure of up to 100 kg/cm² for not less than 10 minutes at a temperature in the range of from 150 to 470° C.

15. The process according to claim 5 or 6, wherein said cylinder-form material is formed by the steps of winding cylindrically said sheet-like molded material in the lengthwise direction in at least a single layer and then fixing an end part of said material with a carbonizable bonding material to the cylindrical body.

16. The process according to claim 5 or 6, wherein said cylinder-form material is formed by the steps of winding cylindrically said sheet-like molded material in the lengthwise direction in at least a single layer onto a cylindrical mold made of graphite, and binding the thus wound sheet-like molded material by graphite fibers.

17. The process according to claim 5 or 6, wherein a thickness of said sheet-like molded material is from 0.1 to 0.8 mm.

18. A carbonaceous cylindrical body prepared by the process according to claim 5 or 6, wherein said carbonaceous cylindrical body shows a carbon content of at least 95% by weight, an oxygen gas permeation coefficient of $10^{-5}$ to $10^{-7}$ cm²/sec. under a partial pressure of oxygen of 1 atm. and a bulk density of from 1.4 to 1.9 g/cm³, and a wall thickness of from 0.1 to 0.8 mm.

* * * * *